United States Patent [19]

Kuwabara et al.

[11] Patent Number: 4,567,208
[45] Date of Patent: Jan. 28, 1986

[54] PRELIMINARILY FOAMED PARTICLES OF NON-CROSSLINKED POLYPROPYLENE-TYPE RESIN

[75] Inventors: Hideki Kuwabara, Hadano; Yoshimi Sudo, Chigasaki, both of Japan

[73] Assignee: Japan Styrene Paper Corporation, Tokyo, Japan

[21] Appl. No.: 678,679

[22] Filed: Dec. 5, 1984

[30] Foreign Application Priority Data

Dec. 7, 1983 [JP] Japan .................. 58-230956

[51] Int. Cl.$^4$ .......... C08J 9/16; C08L 23/20; C08L 23/14
[52] U.S. Cl. .................. 521/59; 521/134
[58] Field of Search .............. 521/59, 58, 134

[56] References Cited

U.S. PATENT DOCUMENTS

| | | | |
|---|---|---|---|
| 3,743,611 | 7/1973 | Muroi | 521/60 |
| 4,379,859 | 4/1983 | Hirosawa | 521/59 |
| 4,399,087 | 8/1983 | Akiyama et al. | 264/53 |
| 4,415,680 | 11/1983 | Ushirokawa et al. | 521/56 |
| 4,436,840 | 3/1984 | Akiyama | 521/58 |
| 4,443,393 | 4/1984 | Akiyama et al. | 264/53 |
| 4,448,901 | 5/1984 | Senda et al. | 521/60 |
| 4,464,484 | 8/1984 | Yoshimura et al. | 521/58 |
| 4,504,534 | 3/1985 | Adachi | 521/58 |
| 4,504,601 | 3/1985 | Kuwabara | 521/58 |

FOREIGN PATENT DOCUMENTS

| | | | |
|---|---|---|---|
| 0053333 | 6/1982 | European Pat. Off. | 521/59 |
| 58-136631 | 8/1983 | Japan | 521/58 |

Primary Examiner—C. Warren Ivy
Attorney, Agent, or Firm—Sherman and Shalloway

[57] ABSTRACT

Preliminarily foamed particles of a non-crosslinked polypropylene-type resin based on a mixture of 10 to 95% by weight of an alpha-olefin/propylene random copolymer having an amount of the heat of crystallization of not more than 10 cal/g in differential scanning calorimetry and 90 to 5% by weight of an ethylene/propylene random copolymer as a base resin, said preliminarily foamed particles having such a crystal structure that when a DSC curve is drawn by heating 1 to 3 mg of the preliminarily foamed particles to 220° C. at a rate of 10° C./min. by means of a differential scanning calorimeter, a high temperature peak is observed at a higher temperature than the temperature of the peak inherent to the base resin. These preliminarily foamed articles can be molded under lower vapor pressures than in the prior art.

6 Claims, 3 Drawing Figures

PRELIMINARILY FOAMED PARTICLES OF NON-CROSSLINKED POLYPROPYLENE-TYPE RESIN

This invention relates to preliminarily foamed particles of a non-crosslinked polypropylene-type resin.

"Bead-foamed molded articles" obtained by filling preliminarily foamed particles in a mold and foaming them under heat (to be referred to hereinbelow sometimes as an "in-mold article" or simply a "molded article") have excellent cushioning properties and heat insulating properties and have been widely used as cushioning materials, packaging materials, heat insulating materials, building materials, etc. The demand for these molded articles has ever been increasing in recent years.

In-mold articles from preliminary foamed particles of polystyrene have been known previously, but it has still been desired to improve them because they have the serious defect of brittleness and also have poor chemical resistance. To eliminate these defects, in-mold articles from preliminarily foamed particles of crosslinked polyethylene were proposed. From the preliminarily foamed particles of crosslinked polyethylene, however, it is difficult to obtain molded articles of a low density (a high expansion ratio) by foaming in a mold. An attempt to make a molded article of a low density therefrom has only resulted in a product having a high shrinkage, a high water absorption and poor properties, which is far from being satisfactory for practical applications. Furthermore, since the unreacted crosslinking agents or the decomposition residues of the crosslinking agents remain in the preliminarily foamed particles of crosslinked polyethylene, they are hygienically undesirable as materials for molding food containers.

The present inventors noted the excellent properties of polypropylene-type resins, and have made investigations on in-mold articles from preliminarily foamed particles of non-crosslinked polypropylene-type resins in order to overcome the defects of conventional in-mold articles.

The preliminarily foamed particles of non-crosslinked polypropylene-type resins sometimes give in-mold articles having a low density (high expansion ratio), a low water absorption and excellent dimensional stability with a low shrinkage, but sometimes only give products having a high shrinkage. Thus, they do not stably and consistently give in-mold articles of good quality. Furthermore, even when in-mold articles of good quality are obtained, high molding vapor pressures are required during molding, and the molded articles do not have entirely satisfactory suppleness and impact strength. Thus, there was still room for improvement.

It is an object of this invention to resolve these problems.

Extensive investigations of the present inventors have led to the discovery that preliminarily foamed particles of a non-crosslinked polypropylene-type resin based on a mixture of specific proportions of an alpha-olefin/propylene random copolymer having a specified amount of the heat of crystallization and an ethylene/propylene random copolymer as a base resin, said preliminarily foamed particles having such a crystal structure that a specific high temperature peak appears in a DSC curve obtained by differential scanning calorimetry, can be molded at lower vapor pressures than the conventional preliminarily foamed particles of non-crosslinked polypropylene-type resins to give good molded articles having excellent properties.

Thus, according to this invention, there are provided preliminarily foamed particles of a non-crosslinked polypropylene-type resin based on a mixture of 10 to 95% by weight of an alpha-olefin/propylene random copolymer having an amount of the heat of crystallization of not more than 10 cal/g in differential scanning calorimetry and 90 to 5% by weight of an ethylene/propylene random copolymer as a base resin, said preliminarily foamed particles having such a crystal structure that when a DSC curve (differential scanning calorimetry thermogram) is drawn by heating 1 to 3 mg of the preliminarily foamed particles to 220° C. at a rate of 10° C./min. by means of a differential scanning calorimeter, a high temperature peak is observed at a higher temperature than the temperature of the peak inherent to the base resin.

The present invention will now be described in detail with reference to the accompanying drawings in which.

The alpha-olefin/propylene random copolymer used in this invention has an amount of the heat of crystallization, determined by differential scanning calorimetry, of not more than 10 cal/g. If a mixture of an alpha-olefin/propylene random copolymer having an amount of the heat of crystallization of more than 10 cal/g with ethylene/propylene random copolymer is used as the base resin, the resulting foamed particles have poor moldability at low vapor pressures, and molded articles finally obtained from the foamed particles have poor improved effects of suppleness and impact strength.

Figure 1:
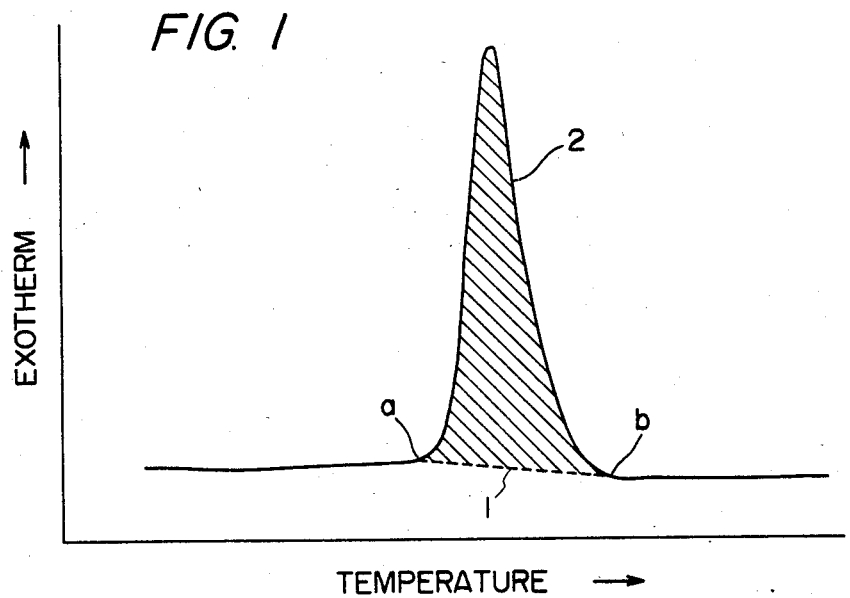
FIG. 1 is a graph showing the method of determining the amount of the heat of crystallization of the base resin on the basis of the DSC curve of the base resin.

The amount of the heat of crystallization is the heat generation energy which is required for the crystallization of an alpha-olefin/propylene random copolymer in the molden state and measured when about 6 to 8 mg of the random copolymer is heated from room temperature to 220° C. at a rate of 10° C./min. by using a differential scanning calorimeter and then cooled to about 50° C. at a rate of 10° C./min. The amount of the heat of crystallization can be obtained from the area of a portion surrounded by a straight line 1 connecting points a and b and a peak 2 in the DSC curve shown in FIG. 1 (the hatched portion in FIG. 1).

As the aforesaid alpha-olefin/propylene random copolymer, there may be used copolymers obtained by copolymerizing alpha-olefins such as 1-butene, 1-pentene or 1-hexene, preferably 1-butene, with propylene in the presence of titanium-containing polymerization catalysts, vanadium-containing polymerization catalysts, etc. Copolymers obtained by using the vanadium-type polymerization catalysts are preferred because preliminarily foamed particles therefrom can be molded at lower vapor pressures than those from copolymers obtained by using the titanium-containing polymerization catalysts. There is no particular restriction on the ratio between the alpha-olefin component and the propylene component. For example, in the case of a 1-butene/propylene random copolymer obtained by using a vanadium-containing polymerization catalyst, its 1-butene content is preferably at least 20 mole% in order for the copolymer to have an amount of the heat of crystallization of not more than 10 cal/g.

The ethylene/propylene random copolymer used in this invention has an ethylene content of preferably at least 2 mole%, especially preferably 3 to 15 mole%. The preliminarily foamed particles of a polypropylene-type resin in accordance with this invention are prepared from a mixture of 10 to 95% by weight of the alpha-olefin/propylene random copolymer having an amount of the heat of crystallization of not more than 10 cal/g and 90 to 5% by weight of the ethylene/propylene random copolymer and a base resin. If the proportion of the alpha-olefin/propylene random copolymer in the base resin is less than 10% by weight, the resulting preliminarily foamed particles are difficult to mold under low vapor pressures, and the final molded articles hardly show an improvement in suppleness and impact strength. If the proportion of the copolymer exceeds 95% by weight, the final molded articles have great dimensional changes upon heating or low compression hardness.

The preliminarily foamed particles of this invention are obtained by foaming the aforesaid base resin mixture composed of the alpha-olefin/propylene random copolymer and the ethylene/propylene random copolymer, and have a crystal structure characterized by the presence of a high temperature peak at a temperature higher than the temperature of a peak inherent to the base resin in their DSC curve drawn on the basis of differential scanning calorimetry. The DSC curve is obtained when 1 to 3 mg of the preliminarily foamed particles are heated to 220° C. at a rate of 10° C./min.

The high temperature peak in the DSC curve can be distinguished from the inherent peak by the following method. A DSC curve obtained when the sample is heated from room temperature to 220° C. at a rate of 10° C./min. is designated a first DSC curve. Then, a DSC curve obtained when the sample is cooled from 220° C. to about 40° C. at a rate of 10° C./min. and again heated to 220° C. at a rate of 10° C./min. is designated a second DSC curve. The peak inherent to the polypropylene-type resin as a base resin is due to endotherm during the melting of the polypropylene-type resin, and generally appears both in the first DSC curve and in the second DSC curve. The inherent peak temperature may slightly differ between the first DSC curve and the second DSC curve, but the difference is less than 5° C., usually less than 3° C.

On the other hand, the high temperature peak as referred to in the present invention is an endothermic peak which appears on the high temperature side of the inherent peak in the first DSC curve. Preliminarily foamed particles of the non-crosslinked polypropylene-type resin which do not show this high temperature peak in their DSC curve have poor moldability in a mold and cannot give molded articles of good quality.

The high temperature peak is due presumably to the presence of a crystal structure which differs from the structure attributed to the above inherent peak. In fact, the high temperature peak appears in the first DSC curve, but does not appear in the second DSC curve obtained by heating the sample under the same conditions. Accordingly, the structure attributed to the high temperature peak is possessed by the preliminarily foamed particles of the polypropylene-type resin provided by this invention.

Desirably, there is a large difference between the temperature of the inherent peak which appears in the second DSC curve and the temperature of the high temperature peak which appears in the first DSC curve. The difference is desirably at least 5° C., preferably at least 10° C.

The preliminarily foamed particles of the non-crosslinked polypropylene-type resin of this invention can be produced, for example, by a process which comprises charging a closed vessel with 100 parts by weight of particles of the aforesaid polypropylene-type resin, 100 to 400 parts by weight of water, 5 to 30 parts by weight of a volatile blowing agent such as dichlorodifluoromethane, and 0.1 to 3 parts by weight of a dispersing agent such as finely divided aluminum oxide, heating the mixture to a temperature of from Tm−25° C. to Tm−5° C. (in which Tm is the temperature at which the melting of the resin particles ends) without heating it above Tm, opening one end of the vessel, releasing the resin particles and water into an atmosphere at a lower pressure than the inside of the vessel, and thus preliminarily foaming the resin particles.

Tm is determined as follows:

By using a differential scanning calorimeter, a sample (6 to 8 mg) is heated to 220° C. at a rate of 10° C./min., then cooled to about 40° C. at a rate of 10° C./min., and again heated to 220° C. at a rate of 10° C./min. In the DSC curve obtained by the second temperature elevation, the point where the bottom line of the endothermic peak meets the base line is defined as Tm.

As stated above, the preliminarily foamed particles of the polypropylene-type resin showing a high temperature peak in the DSC curve can be obtained by not heating the particles above the melting termination temperature Tm in preliminary foaming but restricting the foaming temperature to the above-specified temperature range. If the foaming temperature falls outside the above range, or if it is within the above range but has once been raised above Tm, only the inherent peak appears in the DSC curve of the preliminarily foamed particles, and no high temperature peak appears.

As stated hereinabove, the preliminarily foamed particles of the non-crosslinked polypropylene resin provided by this invention are characterized in that:

(1) a polypropylene-type resin mixture composed of 10 to 95% by weight of the alpha-olefin/propylene random copolymer having an amount of the heat of crystallization, determined by differential scanning calorimetry, of not more than 10 cal/g and 90 to 5% by weight of the ethylene/propylene random copolymer is used as the base resin; and (2) the preliminarily foamed particles have such a crystal structure that when a DSC curve is drawn by heating 1 to 3 mg of the preliminarily foamed particles to 220° C. at a rate of 10° C./min. by means of a differential scanning calorimeter, a high temperature peak is observed at a higher temperature than the temperature of the peak inherent to the base resin.

Because of these characteristics, the preliminarily foamed particles of this invention can be molded at lower vapor pressures than the conventional preliminarily foamed particles of non-crosslinked polypropylene-type resins. Hence, the production of molded articles is easy, and the resulting molded articles have low shrinkage and water absorption with little variations, and higher suppleness and impact strength.

The following Examples and Comparative Examples illustrate the present invention in more detail.

EXAMPLES 1 TO 6 AND COMPARATIVE EXAMPLES 1 TO 5

A closed vessel was charged with 100 parts by weight of particles of each of the base resins indicated in Table 1, 300 parts by weight of water, 0.3 part by weight of ultrafine aluminum oxide (dispersant) and dichlorodifluoromethane (blowing agent) in each of the amounts indicated in Table 1. The mixture was heated under the foaming conditions indicated in Table 1 with stirring to impregnate the resin particles with the blowing agent, and then maintained at the foaming temperature. While the pressure of the inside of the vessel was maintained at 30 kg/cm$^2$-G by nitrogen gas, one end of the vessel was opened and the resin particles and water were simultaneously released into the open atmosphere. As a result, the resin particles were foamed and preliminarily foamed particles were obtained. The apparent expansion ratio of the resulting preliminarily foamed particles is shown in Table 1.

The preliminarily foamed particles obtained were subjected to differential scanning calorimetry by means of a differential scanning calorimeter (Model DT-30, a product of Shimadzu Seisakusho Co., Ltd.), and by drawing DSC curves of the particles, the presence or absence of a high temperature peak was determined. When the high temperature peak appeared in the first DSC curve (as defined hereinabove), the difference (Δt) between the temperature of this high temperature peak and the temperature of the inherent peak appearing in the second DSC curve (as defined hereinabove) was determined. The results are shown in Table 1.

Figure 2:
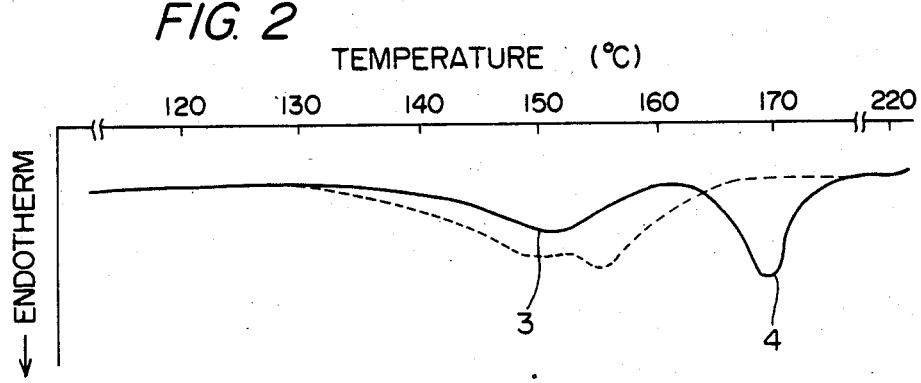
FIG. 2 is a graph showing the DSC curve of the preliminarily foamed particles obtained in Example 1.
Figure 3:
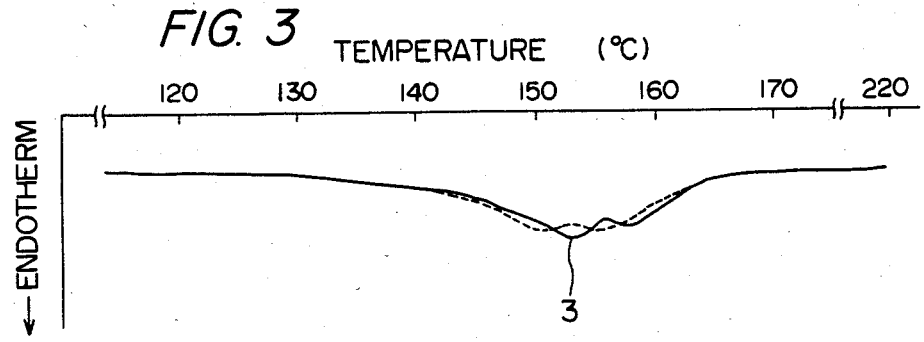
FIG. 3 is a graph showing the DSC curve of the preliminarily foamed particles obtained in Comparative Example 5.

The DSC curve of the preliminarily foamed particles of Example 1 is shown in FIG. 2. The DSC curve of the preliminarily foamed particles of Comparative Example 5 is shown in FIG. 3. In FIGS. 2 and 3, the solid lines show the first DSC curves; the dotted lines, the second DSC curves; 3, the inherent peak; and 4, the high temperature peak.

The preliminarily foamed particles were pressurized with air to impart an internal pressure of 1.5 kg/cm$^2$-G, then filled in a mold having an inside size of 50 mm × 300 mm × 300 mm, and molded under varying vapor pressures. The lowest vapor pressure at which the molding was possible was measured, and the results are shown in Table 2. The molded article obtained by molding the preliminarily particles under the lowest moldable vapor pressure was dried in an oven at 60° C. for 48 hours and then gradually cooled to room temperature. The properties of the molded article were then measured, and the results are also shown in Table 2.

Comparative Example 3 shows the effect of the amount of the heat of crystallization of the alpha-olefin/propylene random copolymer on the moldability of the preliminarily foamed particles as a comparison with Example 6. Comparative Examples 4 and 5 show that molded articles obtained from the preliminarily foamed particles of which DSC curves showed no high temperature peak had poor shrinkage and water absorption.

TABLE 1

| | Particles of the base resin | | | | | | |
|---|---|---|---|---|---|---|---|
| | Alpha-olefin/propylene random copolymer | | | Ethylene/propylene random copolymer | | | |
| | Alpha-olefin (content, mole %) | Amount of the heat of crystallization (cal/g) | Proportion (wt. %) | Ethylene content (mole %) | Amount of the heat of crystallization (cal/g) | Proportion (wt. %) | Tm (°C.) |
| Example | | | | | | | |
| 1 | 1-Butene (50) | 4.8 | 20 | 3.5 | 17.0 | 80 | 165 |
| 2 | 1-Butene (50) | " | 40 | 3.5 | " | 60 | 165 |
| 3 | 1-Butene (50) | " | 60 | 3.5 | " | 40 | 165 |
| 4 | 1-Butene (50) | " | 80 | 3.5 | " | 20 | 165 |
| 5 | 1-Butene (35) | 9.5 | 40 | 4.4 | 16.3 | 60 | 155 |
| 6 | 1-Butene (35) | " | 30 | 7.3 | 15.2 | 70 | 150 |
| Comparative Example | | | | | | | |
| 1 | 1-Butene (50) | 4.8 | 5 | 3.5 | 17.0 | 95 | 165 |
| 2 | 1-Butene (50) | " | 98 | 3.5 | " | 2 | 165 |
| 3 | 1-Butene (22) | 13 | 30 | 7.3 | 15.2 | 70 | 150 |
| 4 | 1-Butene (50) | 4.8 | 40 | 3.5 | 17.0 | 60 | 165 |
| 5 | 1-Butene (35) | 9.5 | 60 | 4.4 | 16.3 | 40 | 155 |

| | Amount of the blowing agent (parts by weight) | Foaming conditions | | Preliminarily foamed particles | | |
|---|---|---|---|---|---|---|
| | | Maximum temperature in the vessel (°C.) | Foaming temperature (°C.) | Apparent expansion ratio | High temperature peak | Δt (°C.) |
| Example | | | | | | |
| 1 | 17 | 155 | 155 | 31 | Present | 15 |
| 2 | 20 | 145 | 145 | 33 | " | 15 |
| 3 | 19 | 145 | 145 | 30 | " | 16 |
| 4 | 17 | 145 | 145 | 31 | " | 17 |

TABLE 1-continued

| | | | | | | |
|---|---|---|---|---|---|---|
| 5 | 16 | 145 | 145 | 30 | " | 16 |
| 6 | 16 | 142 | 142 | 32 | " | 16 |
| Comparative Example | | | | | | |
| 1 | 17 | 155 | 155 | 29 | Present | 15 |
| 2 | 16 | 145 | 145 | 30 | " | 9 |
| 3 | 16 | 142 | 142 | 30 | " | 16 |
| 4 | 14 | 168 | 155 | 30 | Absent | — |
| 5 | 14 | 160 | 145 | 31 | " | — |

TABLE 2

| | Lowest moldable vapor pressure (kg-cm$^2$-G) | Molded article | | | | | | |
|---|---|---|---|---|---|---|---|---|
| | | Expansion ratio | Shrinkage (*1) | Water absorption (*2) | Suppleness (*3) | Impact strength (*4) | Dimensional change on heating (*5) | Compression hardness (*6) (g/cm$^2$-G) | Overall evaluation |
| Example | | | | | | | | | |
| 1 | 3.0 | 30 | O | less than 0.003 g/cm$^3$ | O | O | O | 1.35 | O |
| 2 | 2.5 | 31 | O | less than 0.003 g/cm$^3$ | O | O | O | 1.20 | O |
| 3 | 2.2 | 29 | O | less than 0.003 g/cm$^3$ | O | O | O | 0.90 | O |
| 4 | 2.0 | 30 | O | less than 0.003 g/cm$^3$ | O | O | O | 0.70 | O |
| 5 | 2.5 | 29 | O | less than 0.003 g/cm$^3$ | O | O | O | 1.10 | O |
| 6 | 2.3 | 31 | O | less than 0.003 g/cm$^3$ | O | O | O | 0.65 | O |
| Comparative Example | | | | | | | | | |
| 1 | 4.0 | 28 | O | less than 0.003 g/cm$^3$ | X | X | O | 1.60 | X |
| 2 | 1.8 | 29 | O | less than 0.003 g/cm$^3$ | O | O | X | 0.50 | X |
| 3 | 2.6 | 29 | | | | | | | X |
| 4 | 2.6 | 22 | X | more than 0.03 g/cm$^3$ | | | | | X |
| 5 | 2.7 | 24 | X | more than 0.03 g/cm$^3$ | | | | | X |

(*1): The percentage decrease of the size of the in-mold article in the planar direction based on the size of the mold was calculated, and the results were evaluated by the following scale.
O: the percent decrease was less than 3%.
X: the percent decrease was at least 3%.
(*2): Measured in accordance with the method of JIS K-6767B.
(*3): A rectangular sample, 20 mm in thickness, 300 mm in length and 40 mm in width, was bent in a direction in which the two 40 mm wide edges of the sample 300 mm apart from each other contacted each other, and its suppleness was evaluated on the following scale.
O: The sample did not break when it was completely bent in two.
Δ: The sample did not break when it was bent until the two edges contacted each other.
X: The sample broke before the two edges contacted.
(*4): A disc having a weight of 5 kg and a diameter of 155 mm was let fall horizontally onto the surface of a sample, 50 mm thick, 300 mm long and 300 mm wide, from a height of 1 m, and the degree of breakage of the sample was observed and evaluated on the following scale.
O: The breakage measured less than 10 cm (1/5 of the circumference of the disc).
Δ: The breakage measured at least 10 cm to less than 25 cm (½ of the circumference of the disc).
X: The breakage measured at least 25 cm.
(*5): In a square sample of the in-mold article with one side measuring 150 mm, a square (100 mm × 100 mm) and crossing lines meeting at the center of the square were drawn. The length of each line segment from the center of the square to the point where the crossing lines met the square was precisely measured. The sample was then left to stand for 22 hours in a constant temperature vessel kept at 90 ± 1° C., and allowed to cool at 25° C. for 1 hour. The length of each line segment was precisely measured, and the percent change from the original length was calculated. By the average value of the percent change of the line segments, the dimensional change on heating was evaluated as follows:-
O: less than 4% (no problem in practical applications)
X: at least 4% (could not withstand use)
(*6) Measured in accordance with JIS-K6767.

What is claimed is:

1. Preliminarily foamed particles of a non-crosslinked polypropylene copolymer resin comprising, as a base resin, a mixture of 10 to 95% by weight of an alpha-olefin/propylene random copolymer wherein the alpha-olefin has at least 4 carbon atoms and having an amount of the heat of crystallization of not more than 10 cal/g, as measured by differential scanning calorimetry, and 90 to 5% by weight of an ethylene/propylene random copolymer having an ethylene content of from 3 to 15 mole%, said preliminarily foamed particles having been foamed under conditions such that the maximum temperature of the particles during foaming is in the range of from Tm−25° C. to Tm−5° C., wherein Tm is the temperature at which the melting of the resin particle ends, and wherein the crystal structure of the preliminarily foamed particles is such that when a differential scanning calorimetry thermogram is drawn by heating 1 to 3 mg of the preliminarily foamed particles to 220° C. at a rate of 10° C./min. by means of a differential scanning calorimeter, a high temperature peak is observed at a higher temperature than the temperature of the peak inherent to the base resin.

2. The preliminarily foamed particles of claim 1 wherein the difference between the temperature of the inherent peak and the temperature of the high temperature peak is at least 5° C.

3. The preliminarily foamed particles of claim 1 wherein the alpha-olefin of the alpha-olefin/propylene random copolymer is 1-butene, 1-pentene, or 1-hexene.

4. The preliminarily foamed particles of claim 1 wherein the alpha-olefin of the alpha-olefin/propylene random copolymer is 1-butene.

5. The preliminarily foamed particles of claim 4 wherein the 1-butene content of the alpha-olefin/propylene random copolymer is at least 20 mole%.

6. The preliminarily foamed particles of claim 1 wherein the propylene content of the alpha-olefin/propylene random copolymer is at most 80 mole%.

* * * * *